Feb. 24, 1948.   R. S. HOOD   2,436,771
METHOD OF MAKING PELLETS
Filed July 19, 1943   2 Sheets-Sheet 2

Inventor:
Ralph S. Hood,
by Kern & Folker
Attorney

Patented Feb. 24, 1948

2,436,771

UNITED STATES PATENT OFFICE 2,436,771

METHOD OF MAKING PELLETS

Ralph S. Hood, Danvers, Mass., assignor to Monsanto Chemical Company, St. Louis, Mo., a corporation of Delaware Application July 19, 1943, Serial No. 495,384

5 Claims. (Cl. 23—313)

This invention relates to the pelleting of finely divided solid substances, and particularly to continuous processes for pelleting such materials on a tonnage basis.

In the past it has been common to form pellets of finely divided solid materials by feeding into a rotating drum or cylinder the solid material to be pelleted and a liquid, which can be either water or a solution of or a molten mass of the substance being treated. The solids and liquids supplied to the drum were usually fed in at a point above the rotating mass, and as a result the material adjacent the liquid feed tended to agglomerate and stick to the walls of the drum in the form of a more or less plastic mass, thereby markedly reducing the efficiency of the operation. The pellets produced in this manner are also usually quite voluminous and bulky with the result that it was not possible to pack as large a quantity of the material in the shipping containers as was desired. Also they are usually quite friable and rough surfaced which tends to produce dust during handling.

It is accordingly a primary object of the invention to produce pellets from finely divided solids in a manner which does not result in undue agglomeration or sticking of the solids to the walls of the pelleting apparatus.

A further object of the invention is to produce pellets which are relatively smooth and dense and which do not tend to form dust in subsequent handling of the material.

A further object of the invention is to produce in the drum pellets of relatively uniform size and to avoid the formation of excessively large pellets, whereby it is unnecessary subsequently to classify the pellets or to interrupt the process to remove oversized pellets.

A further object of the invention is to greatly increase the efficiency and output of the usual type of rotary pelleting drum and to adapt such equipment for continuous operations.

Figure 1:
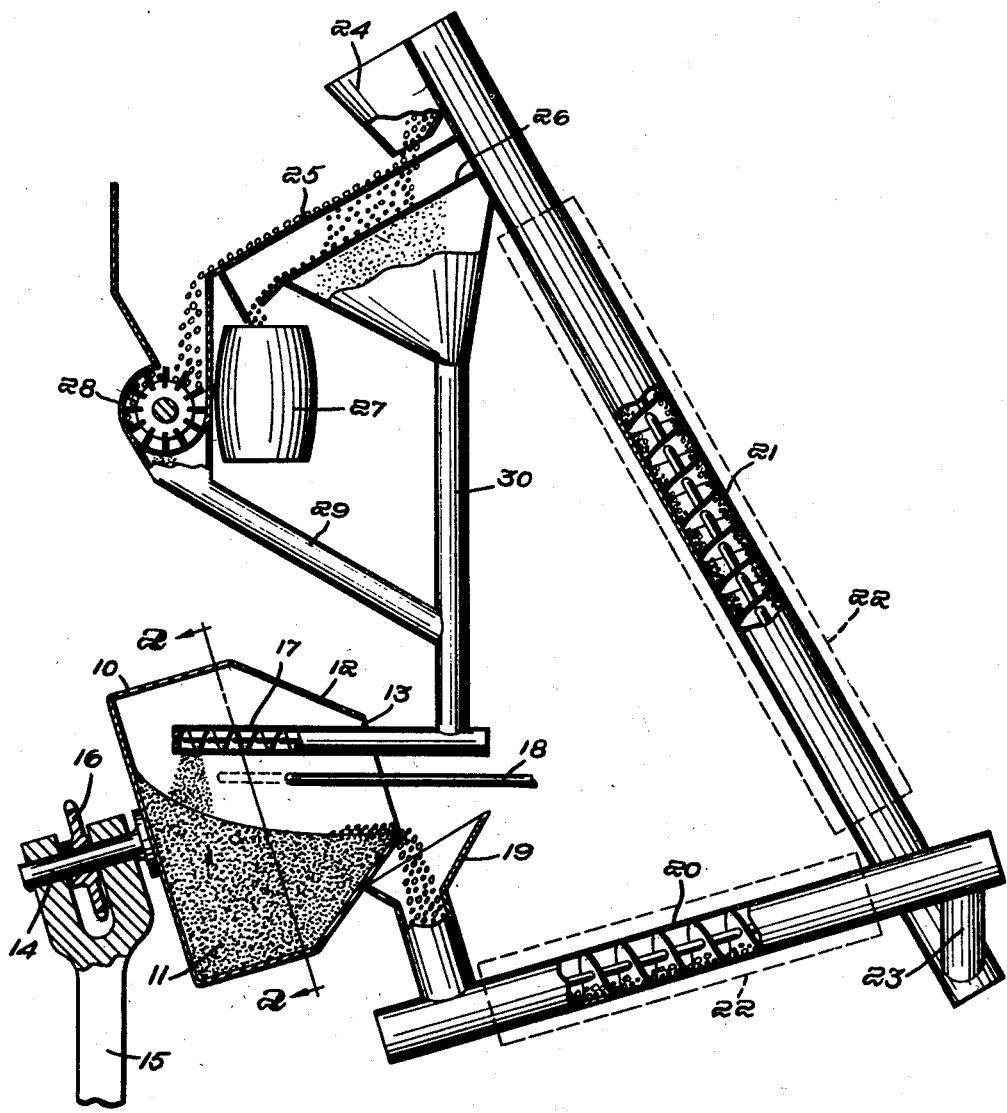

Still further objects and advantages of the invention will appear from the following description and appended claims when considered in connection with the accompanying drawings, in which Fig. 1 is a diagrammatic view, partly in section, of a pelleting apparatus which is equipped with means for recirculating and otherwise treating the pelleted material.

Figure 2:
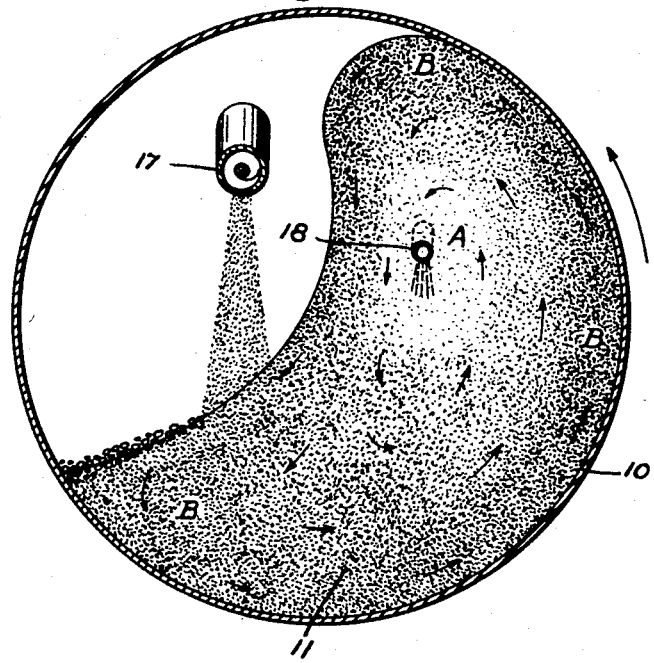

Fig. 2 is a sectional view of the pelleting drum or cylinder taken on the line 2—2 of Fig. 1.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The invention is carried out in general by first supplying to a suitable pelleting drum or cylinder, such as the drum 10 shown in the drawings, a bed 11 of finely divided solids of the substance to be pelleted, and then rotating the drum at such a speed that the material is carried up the side of the drum almost to the top, whereupon it falls in such a way as to produce a waterfall effect. Preferably this operation is carried out in such a manner as to produce a relatively hollow region or a region A of low concentration (see Fig. 2), in which the particles are sparsely arranged and in which the circulation of the particles is partially restricted, that is, in which the particles remain during the greater portion of the actual pellet formation before moving into the outer, faster moving region B of the mass. A liquid, such as water, an aqueous solution of the material being treated, or a molten mass of this material, is then supplied to the drum by feeding it substantially into the relatively hollow or partially restricted region referred to above. If the relative amount of solids and liquid is properly adjusted, a relatively plastic zone is formed, in which the particles and liquid gradually agglomerate and form pellets without contacting the walls of the drum. Thus caking of the material on the drum walls is avoided and the efficiency of the operation is greatly increased. Moreover, by forming the pellets in a relatively plastic zone, much smoother and stronger pellets are formed which are also substantially dust free.

In carrying out the methods of this invention it is possible to use any suitable drum or cylinder having a restricted opening at one or both ends, and arranged to rotate on a horizontal or substantially horizontal axis. In general, it is preferable to tilt the drum somewhat from the horizontal, usually not higher than about 30°, as this increases the capacity of the drum and permits an improved classification of the pellets. Thus, by adjusting the angle of inclination of the drum axis, it is possible to remove selectively from the drum primarily the larger pellets being formed.

This also prevents the formation of excessively large pellets which otherwise tend to remain in the drum and interfere with efficient operation of the apparatus.

In some instances in carrying out the methods of this invention it is unnecessary to resort to any further treatment in order to obtain pellets of the desired characteristics. In other instances, however, it is necessary to cool, heat, dry or otherwise treat the pellets. For example, when molten material is used as the liquid feed, it is usually necessary to cool the mixture being pelleted, while when chemical reaction takes place prior to or during the pellet formation, it is frequently necessary to heat the mixture to initiate or foster the reaction. Drying is usually required in those instances where a solution of the substance being pelleted is employed as the liquid portion of the feed.

Any suitable means may be used to accomplish the cooling, heating or drying of the pellets, when required. For example, such treatment can be accomplished either in the drum itself, as by using a jacketed drum to which a cooling or heating medium is supplied or by circulating air or other gaseous media through the drum, or outside of the drum by removing the pellets from the drum, subjecting them to the desired treatment and recirculating them. In any case, however, that is, whether these supplemental steps are used or not, the chief objects of the invention are accomplished by controlling the amount of materials supplied, the ratio of solid to liquid feed, the position of the liquid feed pipe in the drum and the speed of rotation of the drum, and in those instances where classification is desired, by also adjusting the angle of inclination of the axis of the drum.

The particular apparatus shown in Fig. 1 of the accompanying drawings is primarily useful in pelleting processes in which finely divided solids are mixed with molten material and in which the maintenance of predetermined temperature conditions in zone A of the drum is required, i. e. temperatures considerably below the freezing point of the material being pelleted. Thus, although the material in zone A is maintained in a relatively plastic state as compared with the remainder of the material in the drum, the capacity of the drum is increased if the temperature in zone A is maintained well below the freezing point. In the case of phthalic anhydride, for example, the temperature of zone A is preferably held at a point 30° C. or more below the freezing point. Although reference is made solely to the treatment of phthalic anhydride in describing the operation of the apparatus shown, it should be understood that the invention is adapted to the treatment of other materials, and that in such cases it is merely necessary to resort to common expedients in either heating, cooling or drying the material, as required.

Referring to Fig. 1, the numeral 10 represents a rotary drum of the type which is closed at one end and terminates at its other end in a frustrated cone 12 having an opening 13 of sufficient size to permit the feeding of the materials to be treated and the egress of the pellets resulting from the rotation of the drum. Drum 10 is supported at its closed end by the rotary shaft 14, which in turn is supported by the U-shaped bracket or other suitable support 15. Rotation is obtained by means of the sprocket 16 and any suitable source of power (not shown). The phthalic anhydride to be pelleted is fed into the drum, preferably in finely divided form, by means of the screw conveyor 17, while the molten phthalic anhydride is supplied by means of the pipe 18 from any suitable source of supply (not shown). The pellets formed as a result of the mixing and rotating action of the drum gradually spill over into the hopper 19, and are cooled upon passing through the screw conveyors 20 and 21, which may be jacketed as indicated at 22 to permit the application of any suitable cooling medium. The conveyors 20 and 21 are connected by the pipe 23 to permit continuous flow of the pellets from one conveyor to the other, and conveyor 21 terminates at its upper end in a shoot or hopper 24 which feeds the pellets onto the screens 25 and 26, where they are separated from the fines. The pellets caught on the screen 26 are delivered as finished product to the barrel or other suitable receptacle 27, while the pellets on the screen 25 are passed through the grinding mechanism 28 and returned to the pelleting drum through the pipe 29 along with the fines which drop down through the pipe 30 to the conveyor 17.

In starting the apparatus, a sufficient amount of phthalic anhydride is fed into the drum 10, after being ground in the grinder 28, to fill the drum about half full. This initial bed 11 of finely divided phthalic anhydride is then rotated in the drum at such a speed that the anhydride tends to ride up the upmoving side wall of the drum and fall over much in the manner of a waterfall. By rotating the material in this manner a relatively hollow or sparsely filled region A of partially restricted movement (see Fig. 2) is formed in the rotating mass. The molten anhydride is then supplied by means of the pipe 18, which is inserted into the rotating mass of solids at about the middle of the region A. By proceeding in this way it is possible to maintain the pipe 18 in a predetermined position without the rotating mass tending to move it or snap it off its supports. Moreover, the molten material is fed to a slow moving or partially restricted region, in which the particles remain, more or less as in an eddy current, during a large part of the pelleting operation before moving into the outer faster moving region B of the mass. This permits the mass to become plastic and to form the pellets slowly with the result that they are harder and smoother than pellets formed in ordinary pelleting operations.

As previously indicated, control of the temperature of the rotating mass in the drum 10 is obtained by cooling the pellets outside of the drum and returning a portion of them together with the fines to the drum. Temperature control may be obtained in other ways, however, as for example, by merely controlling the relative amounts of liquid and solid feed, without recirculation, or by using a jacketed drum and supplying a suitable cooling medium thereto. If desired, all three of these methods may be used to obtain the desired cooling or temperature control, namely, recirculation, cooling of the drum, and adjustment of the ratio of hot molten and cool solid feeds.

Although the pelleting drum shown in the drawings is of the type which is closed at one end, other types of drums may be used, if desired, including drums open at both ends. It is also not always essential to use a conical-shaped end construction, although inclined walls at the exit end of the drum facilitate the egress of the pellets and the selective removal of pellets of a relatively uniform size range. Classification of the pellets in the drum itself is controlled further by adjusting the angle of inclination of the drum axis from the horizontal, but it is also possible to obtain good results, either with or without classification, in a horizontally arranged drum.

Any suitable arrangement for recirculating the pellets may be substituted for that shown in the drawings, as it is primarily important merely to provide suitable means for cooling the pellets and preparing them for return to the pelleting drum, as by grinding. A separate grinding apparatus is not always necessary, however, as in some instances there is sufficient attrition between the particles passing through the screw conveyors to provide sufficient fines for return to the drum. Moreover, attrition of the particles in the drum itself is sometimes sufficient for this purpose.

The apparatus shown in the drawings has been described as applicable to the treatment of phthalic anhydride particles. It may, however, also be used, either unchanged or with slight variations in the recirculating equipment, for the pelleting of other substances such as ferric sulfate, aluminum sulfate, and the like. With certain substances, for example reactive mixtures of sodium chloride and sodium acid sulfate, heating of the pellets is required instead of cooling. In using the apparatus shown it is then only necessary to apply a heating medium to the jackets of the conveyor 20 and/or 21 instead of a cooling medium. Likewise, if the recirculating equipment is omitted and a jacketed drum is used instead, a heating medium is employed instead of a cooling medium. In still other instances, as in the case of ferric sulfate, in which a ferric sulfate solution is used as the liquid feed, the pellets are dried instead of being heated or cooled, and in such cases the recirculating equipment is arranged to include a drying mechanism, such as any conventional rotary drier.

In most instances, the processes of this invention involve the mixing of a liquid and a finely divided solid substance in the rotary drum. However, it is also possible to supply two or more solid substances, one of which upon being heated melts and then reacts with the residual solid substance or substances. While reaction takes place the molten liquid formed simultaneously mixes with the solid material present to form pellets. For example, sodium acid sulfate may be mixed with sodium chloride in a rotary drum, such as the drum 10, while simultaneously heating the mixture. The acid sulfate soon melts, and reacts with the sodium chloride to form hydrogen chloride gas and sodium sulfate. During the reaction the solid and liquid particles present in the mixture form pellets due to the rotary action of the drum on the mass, which pellets upon leaving the drum are completely converted to sodium sulfate. In carrying out a process such as the above, the two solid substances may be supplied to the drum either as a previously prepared mixture or in separate feed pipes or conveyors. In either case, however, the conveyor or conveyors should be arranged to discharge into the partially restricted zone A in order to obtain the advantages of this invention.

It is also possible to supply to the drum finely divided seed material along with two or more liquids, which liquids react upon mixing to form a solid substance of the same composition as the seed material. Prior to reaction the liquids agglomerate the seed material, and upon completion of the reaction the liquid portion of the agglomerates solidify, thereby binding the seed particles into the form of relatively hard and smooth pellets.

In some instances, as for example, when the material to be pelleted is sufficiently friable to form fines by attrition in the rotating drum, and the liquid employed is a hot molten liquid, the process may be carried out continuously without the addition of new fines or the recirculation of a portion of the pelleted product as fines, i. e. by continuously supplying only the hot molten liquid to the drum and simultaneously cooling to solidify the liquid about the fine particles already present or resulting from attrition. In general, however, it is preferable to supply continuously along with the liquid being used a proportionate amount of finely divided solids to provide the nuclei for additional pellets, since in most cases insufficient breakage of the pellets takes place in the drum to provide enough fines for practical operation. Moreover, the processes of this invention usually tend to form pellets of relatively hard and smooth surfaces, which do not readily break up to form fines. Regardless, however, of the physical state of the materials which are continuously supplied to the drum, it is essential in order successfully to carry out this invention to start the process with an initial bed of finely divided solids in the drum and to direct the liquid feed, or the material which becomes liquid during the process, into the drum at a point below the surface of the rotating mass in the drum, preferably at a point within the hollow or more or less sparsely filled region of restricted circulation referred to.

By proceeding in accordance with the various methods described above it is possible to obtain discrete pellets of generally round shape, which are relatively dense and hard and have an exceptionally smooth surface. The pellets consist of agglomerates of relatively small particles which have been bonded together by solidification of the liquid employed or formed during the process. For example, in the case of phthalic anhydride the pellets consist of agglomerates of relatively small particles of phthalic anhydride bonded together by means of phthalic anhydride material which has been solidified from a molten state. In all instances, the pellets are characterized by being free flowing and free from a tendency to form dust under normal conditions of handling and use.

Where reference is made herein and in the appended claims to finely divided solids, it is to be understood that this has reference to either a powdered material or to particles of larger size, which are nevertheless smaller than the pellets it is desired to produce.

I claim:

1. The method of continuously pelleting finely divided solids which comprises initially supplying a mass of such solids to a rotary drum of the type which rotates about an axis not inclined more than about 30° from the horizontal, continuously rotating said drum at such a speed that the mass of solids rides up the upmoving side wall of the drum to the upper portion thereof and falls over inwardly, thereby forming a relatively sparsely filled region of relatively restricted circulation in the central portion of the rotating mass, continuously supplying additional finely divided solids and a liquid to said drum, said liquid being fed into said drum at a point below the surface of the rotating mass and within the region of relatively restricted circulation and being supplied in an amount with relation to the supply of solids to provide a plastic zone within the mass, whereby smooth-surfaced and relatively hard pellets are formed while out of direct contact with the walls of the drum.

2. The method of continuously pelleting finely divided solids which comprises initially supplying a mass of such solids to a rotary drum of the type which rotates about an axis not inclined more than about 30° from the horizontal, continuously rotating said drum at such a speed that the mass of solids rides up the upmoving side wall of the drum to the upper portion thereof and falls over inwardly, thereby forming a relatively sparsely filled region of relatively restricted circulation in the central portion of the rotating mass, continuously supplying additional finely divided solids and hot molten liquid to said drum, said liquid being fed into said drum at a point below the surface of the rotating mass and within the region of relatively restricted circulation and being supplied in an amount with relation to the supply of solids to provide a plastic zone within the mass, said rotating mass being continuously cooled to a temperature considerably below the freezing point of said liquid, whereby smooth-surfaced and relatively hard pellets are formed while out of direct contact with the walls of the drum.

3. The method substantially as described in claim 2 but further characterized in that said finely divided solids and said hot molten liquid consist substantially of phthalic anhydride.

4. The method of continuously pelleting finely divided solids which comprises initially supplying a mass of such solids to a rotary drum of the type which rotates about an axis not inclined more than about 30° from the horizontal, continuously rotating said drum at such a speed that the mass of solids rides up the upmoving side wall of the drum to the upper portion thereof and falls over inwardly, thereby forming a relatively sparsely filled region of relatively restricted circulation in the central portion of the rotating mass, continuously supplying additional finely divided solids and a liquid to said drum, said liquid being fed into said drum at a point below the surface of the rotating mass and within the region of relatively restricted circulation and being supplied in an amount with relation to the supply of solids to provide a plastic zone within the mass, whereby smooth-surfaced and relatively hard pellets are formed while out of direct contact with the walls of the drum, said additional finely divided solids being supplied by continuously separating a portion of said pellets, subdividing the same, and returning said separated portion to the drum, said pellets being dried prior to returning the same to the drum.

5. The method substantially as described in claim 4, but further characterized in that said finely divided solids consist substantially of ferric sulfate and said liquid consists substantially of an aqueous solution of ferric sulfate.

RALPH S. HOOD.

REFERENCES CITED

The following references are of record in the file of this patent:

UNITED STATES PATENTS

| Number | Name | Date |
|---|---|---|
| 1,239,221 | Rodman | Sept. 4, 1917 |
| 1,891,754 | Daniels | Dec. 20, 1932 |
| 1,892,074 | Nielsen | Dec. 27, 1932 |
| 2,047,393 | Siems | July 14, 1936 |
| 2,158,513 | Lloyd | May 16, 1939 |
| 2,208,175 | Wilson | July 16, 1940 |
| 2,301,103 | Wilson | Nov. 3, 1942 |
| 2,304,382 | Shoeld | Dec. 8, 1942 |
| 2,311,154 | Carney | Feb. 16, 1943 |
| 2,343,401 | Carney | Mar. 7, 1944 |